US008113138B2

(12) United States Patent
Trejo

(10) Patent No.: US 8,113,138 B2
(45) Date of Patent: Feb. 14, 2012

(54) APPARATUS FOR APPLICATION OF DECORATIVE ITEMS TO FOOD PRODUCTS

(75) Inventor: Joaquin Alverde Trejo, Estado (MX)

(73) Assignee: Grupo Bimbo S.A.B. de C.V., Mexico City, D.F. (MX)

( * ) Notice: Subject to any disclaimer, the term of this patent is extended or adjusted under 35 U.S.C. 154(b) by 824 days.

(21) Appl. No.: 12/183,612

(22) Filed: Jul. 31, 2008

(65) Prior Publication Data

US 2009/0031946 A1  Feb. 5, 2009

(30) Foreign Application Priority Data

Aug. 2, 2007 (MX) .................... MX/a/2007/009318

(51) Int. Cl.
*A23G 9/28* (2006.01)
(52) U.S. Cl. ................ 118/13; 118/14; 118/23; 118/24; 118/308; 118/712
(58) Field of Classification Search .................... 118/13, 118/14, 23, 24, 308, 688, 676, 712; 99/494; 426/289, 292; 141/156, 157
See application file for complete search history.

(56) References Cited

U.S. PATENT DOCUMENTS

| 5,458,055 | A  | * | 10/1995 | Fitch, Jr. | ...................... | 99/450.1 |
| 6,051,070 | A  | * | 4/2000 | Sunter | ........................... | 118/678 |
| 7,878,142 | B2 | * | 2/2011 | Taylor et al. | ..................... | 118/13 |

* cited by examiner

*Primary Examiner* — Laura Edwards
(74) *Attorney, Agent, or Firm* — Brinks Hofer Gilson & Lione

(57) ABSTRACT

An apparatus for the automated decoration of a food product, the apparatus includes: a transporter configured to move the food product to a decoration area of the apparatus; a detector configured to detect the food product in the decoration area; a deposition mechanism disposed above the decoration area, the deposition mechanism comprising a sliding plate disposed between a first fixed plate and a second fixed plate; wherein, in a first position of the sliding plate, cavities extending though the sliding plate are aligned with cavities extending through the first fixed plate, and in a second position, the cavities extending through the sliding plate are aligned with cavities extending through the second fixed plate.

19 Claims, 2 Drawing Sheets

APPARATUS FOR APPLICATION OF DECORATIVE ITEMS TO FOOD PRODUCTS

CLAIM OF PRIORITY

This application claims priority under 35 USC §119 to Mexican Patent Application Serial No. MX/a/2007/009318, filed on Aug. 2, 2007, the entire contents of which are hereby incorporated by reference.

TECHNICAL FIELD

This invention relates to bakery and confectionary products, and more particularly to applying decorative items to such products.

BACKGROUND

Most of the bakery or confectionery products currently in the market are to decorated in order to improve their aspect and, of course, to incite their consumption and to achieve an increase in sales. The decoration of such bakery or confectionery products has included the application of multicolored candy granules, sesame seeds, granulated sugar and even powdered sugar, apart from other products which contribute to improve the external appearance of products such as cookies, rolls, etc.

SUMMARY

The decoration of bakery or confectionery products has mainly been an artisan activity and, in many cases, will continue to be an artisan activity since the complexity of their decoration requires so. However, there are numerous products to which automated decoration techniques described herein can be applied, resulting in savings in the material used for their decoration, as well as in an increase of productivity.

The present disclosure describes equipment or apparatus for the application of bulk products, for decorating purposes, on the exposed area of bakery or confectionery products, under a precise control of the quantity of the decorating supplied product, with a low waste percentage. More specifically, the present disclosure describes an equipment or apparatus that includes means for the transportation of the products to be decorated towards the decoration area, means to detect the presence of such products in the decorating area, a deposit for the decorating material, which will be poured on the area of the exposed face of the product to be decorated by means of a set of templates with controlled supply of such decorating material, where such set of templates consists of two fixed templates and one sliding template, the latter located between the fixed templates and being sequentially operated in response to the signals issued by the detection means that indicate the presence of the product to be decorated; such template shows a decorating material unloading pattern that matches the form or configuration of the product to be decorated.

This disclosure also describes the design and construction of equipment including the features previously described; where the decorating material is supplied in a pattern that matches the configuration or form of the upper surface of the bakery or confectionery product to be decorated thus limiting the unnecessary waste of the decorating material, discriminating those areas where there is no bakery or confectionery product.

This disclosure also describes equipment or devices to carry out the decoration of bakery or confectionery product or items in an automated, controlled way that limits decorating material waste and that supplies such decorating material within a pattern that matches the product to be decorated, facilitating the change of pattern for the supply of decorating material as well as the cleaning of the equipment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
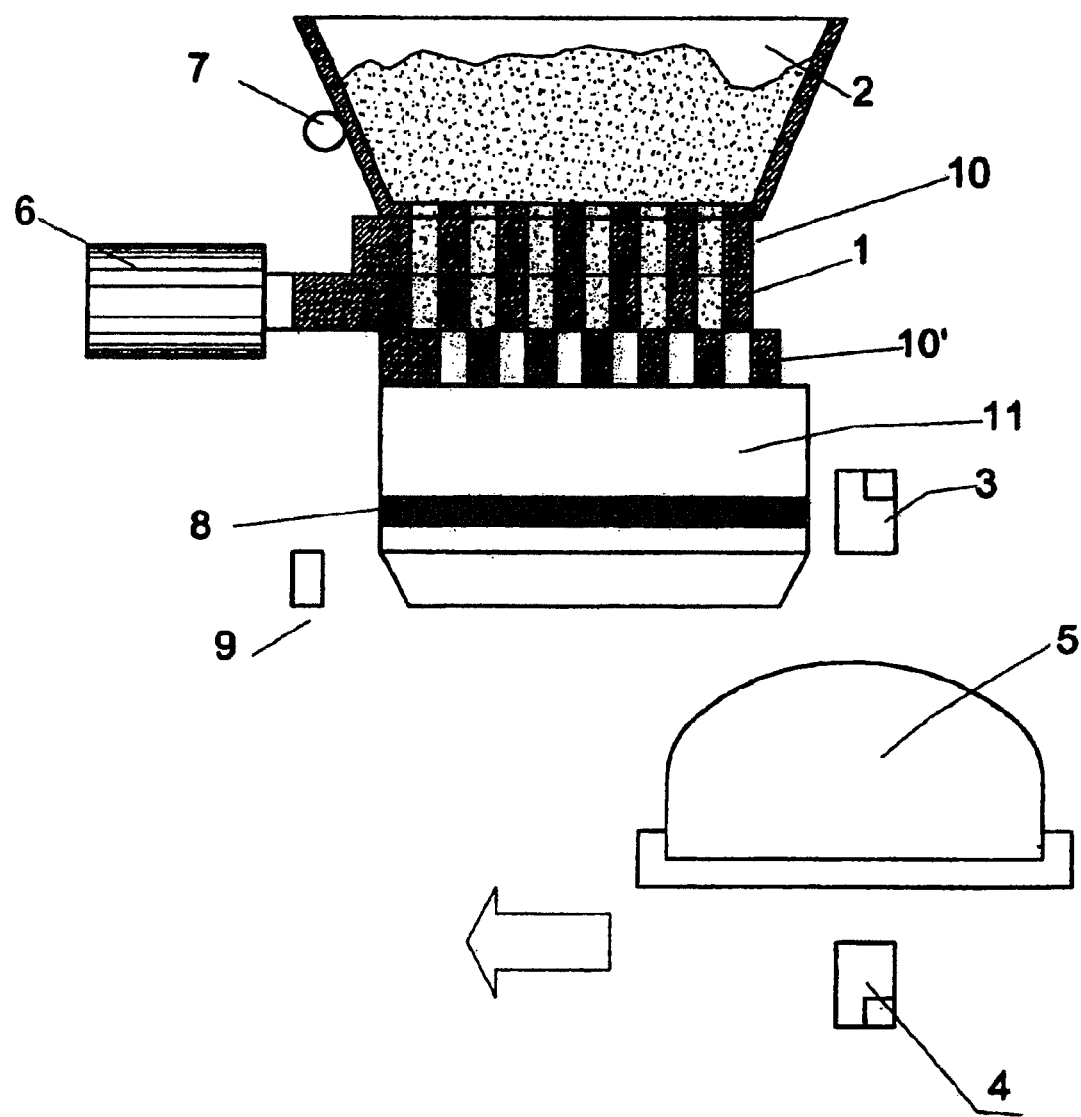
FIGS. 1 and 2 are schematic representations of an apparatus to carry out the decoration of a bakery or confectionery product at different production line stages.
Figure 2:
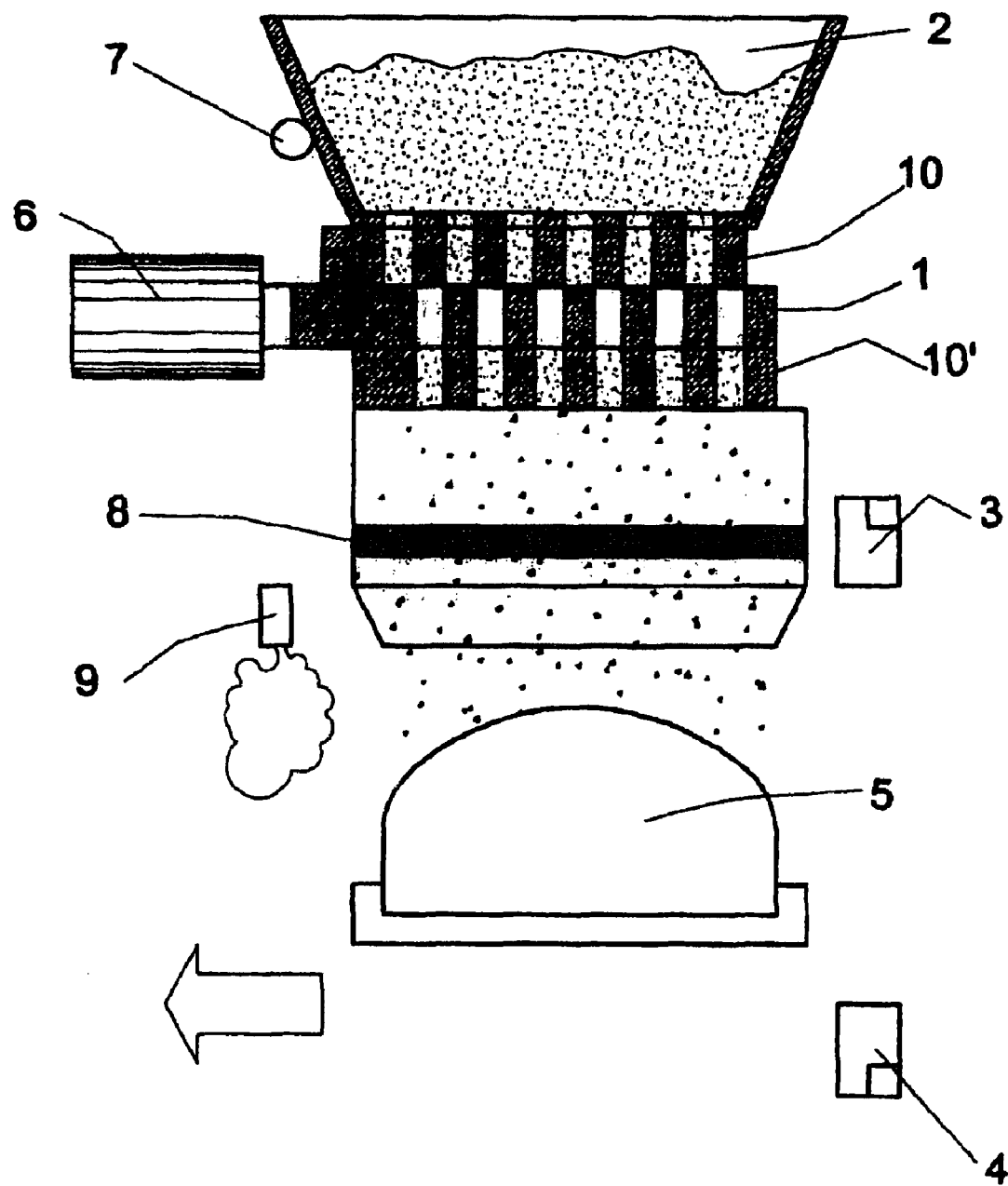

As may be seen in FIGS. 1 and 2, a decorating apparatus includes a hopper 2 containing the product for the decoration of the bakery or confectionery products or pieces 5. The hopper 2 can contain a proper quantity of such decorating material in order to enable a continuous process. A vibrator 7 vibrates the hopper 2 so as to induce the decorating material to fall towards the bakery or confectionery product 5 by means of fixed templates 10, 10' and a mobile template 1.

Note that the mobile template 1 is located between the fixed templates 10 and 10' and slides between them in order to unload the decorating material in a predetermined quantity and on the upper surface of the bakery or confectionery product 5, taking into account that the mobile template has a configuration or form and an unloading pattern of decorating material that matches the configuration or form of the upper surface of the bakery or confectionery product 5 to be decorated. The set of the fixed templates 10 and 10' and the mobile or sliding template 1 are located between the hopper 2 and the container 11. Container 11 can be provided with a mesh 8 that helps to uniformly spread the decorating material on the exposed surface of bakery or confectionery product that is being decorated.

The equipment is provided with photocells 3 and 4, the first of which detects the presence of a product to be decorated and the second detects the presence of a "cavity", preparing thus the equipment to act.

When both signals detecting the presence of product and "cavity" are present, a processor starts counting down a specified time to start up the automated cylinder 6, resulting thus in the displacement of the mobile template 1 to a point where it allows the decorating material unloading into the container 11 and from container 11 towards the bakery product 5 to be decorated through dispenser mesh 8, while the passage of additional decorating material towards the mobile template 1 cavities is blocked. The processor then repeats a new operating cycle of the apparatus, which starts with the removal of the mobile template to a point that its cavities match with the cavities of the fixed template 10 and the cavities of the mobile template are filled up with decorating material again.

Note that the quantity of the decorating material deposited on the upper surface of the bakery or confectionery product 5 is determined by the number and dimensions (e.g., volumes) of the cavities contained in the fixed templates 10 and 10' and the sliding template 1.

The nozzle 9 that supplies compressed air is periodically powered, at specific times, and sweeps the decorating material which might have scattered off of the bakery or confectionery product, thus contributing to keep the equipment clean.

As previously mentioned, the apparatus of this application and its operation have been clearly illustrated in the drawings accompanying it. Although such equipment has been represented in a schematic way, those parts that stand out and contribute to its operation have been clearly described. In particular, the application of the decorating material on the bakery or confectionery production can follow a pattern that matches the form or configuration of the upper surface of the product to be decorated. The intermittent application of the decorating material takes place as a result of the detection of presence of the product to be decorated. The equipment can provide a substantial saving of decorating material (e.g., of at least 30%) with respect to the other equipment.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for the automated decoration of a food product, the apparatus comprising:
    a hopper with an interior cavity configured to hold a supply of a decorating material;
    a transporter configured to move the food product to a decoration area of the apparatus;
    a detector configured to detect the food product in the decoration area;
    a deposition mechanism for applying the decorating material to the food product, the deposition mechanism disposed above the decoration area, the deposition mechanism comprising a sliding plate having a plurality of cavities extending therethrough from an upper to a lower surface of the sliding plate, the sliding plate disposed adjacent to and between a first fixed plate having a plurality of cavities extending therethrough from an upper to a lower surface of the first fixed plate and a second fixed plate having a plurality of cavities extending therethrough from an upper to a lower surface of the second fixed plate;
    wherein the cavities extending through the first fixed plate open onto the interior cavity of the hopper; and
    wherein, in a first position of the sliding plate, the cavities extending though the sliding plate are aligned with the cavities extending through the first fixed plate, and in a second position, the cavities extending through the sliding plate are aligned with cavities extending through the second fixed plate.

2. The apparatus of claim 1, wherein the cavities extending through the sliding plate are disposed in a predetermined pattern that disburses decorating material onto the upper surface of the food product disposed on the transporter, the pattern substantially matching the form and size of the food product.

3. The apparatus of claim 1, wherein the cavities extending through the sliding plate are arranged in a pattern that substantially matches the pattern of the cavities in the second fixed plate.

4. The apparatus of claim 3, wherein the cavities extending through the first fixed plate and the cavities extending through the second fixed plate have patterns which correspond with the pattern of the cavities extending through the sliding plate.

5. The apparatus of claim 1, wherein a volume of the cavities extending through the sliding plate corresponds to a predetermined amount of decorating material to be applied to the upper surface of the food product.

6. The apparatus of claim 1, wherein the detector comprises a photocell.

7. The apparatus of claim 6, wherein the photocell is configured to provide a signal to a pneumatic cylinder operable to move the sliding plate to positions including the first position of the sliding plate and the second position of the sliding plate.

8. The apparatus of claim 1, comprising a distribution mesh disposed between a lower surface of the second fixed plate and an upper surface of food products disposed on the transporter.

9. The apparatus of claim 1, comprising a cleaning mechanism configured to remove excess decorating material from the decoration area.

10. The apparatus of claim 9, wherein the cleaning mechanism comprises a nozzle connected to a source of compressed air.

11. The apparatus of claim 9, wherein the cleaning mechanism is configured to recycle the excess decorating material for reuse.

12. The apparatus of claim 1, wherein each of the cavities in the second fixed plate includes an aperture on the lower surface of the second fixed plate, said apertures configured to dispose decorating material onto the upper surface of the food product in a predetermined design.

13. An apparatus for the automated decoration of a food product, the apparatus comprising:
    a hopper with an interior cavity configured to hold a supply of a decorating material;
    a transporter configured to move the food product to a decoration area of the apparatus;
    a detector configured to detect the food product in the decoration area; and
    a deposition mechanism for applying the decorating material to the food product, the deposition mechanism disposed above the decoration area, the deposition mechanism comprising a sliding plate having a plurality of cavities extending therethrough from an upper to a lower surface of the sliding plate, the sliding plate disposed adjacent to and between a first fixed plate having a plurality of cavities extending therethrough from an upper to a lower surface of the first fixed plate, and a second fixed plate having a plurality of cavities extending therethrough from an upper to a lower surface of the second fixed plate, the deposition mechanism operable to sequentially move the sliding plate between a first position and a second position at least partially in response to a signal from the detector;
    wherein the cavities extending through the first fixed plate open onto the interior cavity of the hopper; and
    wherein the sliding plate has a decorating material unloading pattern that matches a form or configuration of the food product.

14. The apparatus of claim 13, wherein the detector comprises a photocell configured to provide a signal to a pneumatic cylinder operable to move the sliding plate to positions including the first position of the sliding plate and the second position of the sliding plate;
    wherein the cavities extending through the second fixed plate from an upper surface to a lower surface of the second fixed plate are disposed in a pattern that disperses the decorating material in a predetermined unloading pattern onto the surface of the food product.

15. The apparatus of claim 13, wherein the first and second fixed plates each define a series of matching cavities extending therethrough which determine, jointly with cavities extending through the sliding plate, the quantity of a decorating material deposited in the exposed area of the decorated products.

16. The apparatus of claim 15, wherein, in the first position of the sliding plate, cavities extending though the sliding plate are aligned with cavities extending through the first fixed plate, and in the second position, the cavities extending through the sliding plate are aligned with cavities extending through the second fixed plate.

17. The apparatus of claim 13, comprising a distribution mesh disposed between a lower surface of the second fixed plate and an upper surface of food products disposed on the transporter.

18. The apparatus of claim 13, comprising a cleaning mechanism comprising a nozzle connected to a source of compressed air, the cleaning mechanism configured to remove excess decorating material from the decoration area and to recycle the excess decorating material for reuse.

19. The apparatus of claim 13, wherein each of the cavities in the second fixed plate includes apertures on the lower surface of the second fixed plate, said apertures configured to dispose decorating material onto the upper surface of the food product in a predetermined design.

* * * * *